(12) United States Patent
Drennen et al.

(10) Patent No.: US 9,926,073 B2
(45) Date of Patent: Mar. 27, 2018

(54) AIRCRAFT BRAKE PUCK ASSEMBLY

(71) Applicant: GOODRICH CORPORATION, Charlotte, NC (US)

(72) Inventors: David Drennen, Bellbrook, OH (US); Kevin Rehfus, Troy, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 1 day.

(21) Appl. No.: 14/531,648

(22) Filed: Nov. 3, 2014

(65) Prior Publication Data

US 2016/0122009 A1    May 5, 2016

(51) Int. Cl.
| | |
|---|---|
| *F16D 65/18* | (2006.01) |
| *F16D 125/40* | (2012.01) |
| *B64C 25/44* | (2006.01) |
| *F16D 121/24* | (2012.01) |
| *F16D 125/06* | (2012.01) |

(52) U.S. Cl.
CPC ............ *B64C 25/44* (2013.01); *F16D 65/18* (2013.01); *F16D 65/186* (2013.01); *F16D 2121/24* (2013.01); *F16D 2125/06* (2013.01); *F16D 2125/40* (2013.01)

(58) Field of Classification Search
CPC ... F16D 2125/40; F16D 65/092; F16D 65/095
USPC ...................................................... 188/71.5
See application file for complete search history.

(56) References Cited

U.S. PATENT DOCUMENTS

| | | | | |
|---|---|---|---|---|
| 2,937,722 A | * | 5/1960 | Ruet ..................... | F16D 65/095 188/152 |
| RE24,870 E | * | 9/1960 | Butler .................. | F16D 55/228 188/322.12 |
| 3,371,753 A | * | 3/1968 | Meier ................... | F16D 55/224 188/196 P |
| 4,036,330 A | * | 7/1977 | Henning ............... | F16D 55/224 188/72.8 |
| 4,359,976 A | * | 11/1982 | Steele ....................... | F02F 3/12 123/193.6 |
| RE31,212 E | * | 4/1983 | Smith .................. | B60G 13/008 280/124.147 |
| 4,781,272 A | * | 11/1988 | Sheill .................... | F16D 55/227 188/250 B |
| 5,236,403 A | * | 8/1993 | Schievelbusch ........ | F16H 15/28 280/236 |

(Continued)

FOREIGN PATENT DOCUMENTS

| | | |
|---|---|---|
| DE | 1257603 | 12/1967 |
| EP | 0480358 | 4/1992 |

OTHER PUBLICATIONS

Extended European Search Report dated Apr. 14, 2016 in European Application No. 15192699.5.

*Primary Examiner* — Thomas J Williams
*Assistant Examiner* — James K Hsiao
(74) *Attorney, Agent, or Firm* — Snell & Wilmer L.L.P.

(57) ABSTRACT

An electro-mechanical actuator in an aircraft brake may include a ball nut piston, and endcap coupled to the ball nut piston, a retaining ring coupled to the endcap, and a puck secured within the endcap. The puck may be permanently retained within the retaining ring. The retaining ring may be a split ring which is installed around a base of the puck. The puck may be inserted within a single-piece retaining ring, and the retaining ring may be bent over a base of the puck.

14 Claims, 6 Drawing Sheets

(56) References Cited

U.S. PATENT DOCUMENTS

| | | | | |
|---|---|---|---|---|
| 5,443,141 A * | 8/1995 | Thiel | F16D 65/567 188/196 D |
| 6,125,973 A * | 10/2000 | Irvine | F16D 65/092 188/24.22 |
| 6,186,286 B1 * | 2/2001 | Haussler | F16D 55/38 188/71.9 |
| 6,209,582 B1 * | 4/2001 | Ashley | B60T 8/327 137/625.5 |
| 6,412,610 B1 * | 7/2002 | Drennen | F16D 55/227 188/156 |
| 6,554,542 B2 * | 4/2003 | Mano | E02D 27/34 405/251 |
| 6,607,059 B1 * | 8/2003 | Kapaan | F16D 65/18 188/72.8 |
| 6,691,837 B1 * | 2/2004 | Kapaan | F16D 65/18 188/156 |
| 6,719,103 B1 * | 4/2004 | Kapaan | F16D 65/18 188/162 |
| 6,991,074 B1 * | 1/2006 | Mackiewicz | F16D 55/226 188/73.39 |
| 7,066,304 B2 * | 6/2006 | Severinsson | B60T 13/741 188/162 |
| 7,344,006 B2 * | 3/2008 | Edmisten | F16D 55/36 188/206 R |
| 2002/0046530 A1 * | 4/2002 | Drake | E04C 3/30 52/649.2 |
| 2004/0040797 A1 * | 3/2004 | Plude | F16D 65/186 188/156 |
| 2004/0079596 A1 * | 4/2004 | Roberts | F16D 55/2262 188/73.31 |
| 2005/0167211 A1 | 8/2005 | Hageman et al. | |
| 2007/0012126 A1 * | 1/2007 | Corbett | F16D 65/18 74/89.26 |
| 2007/0261926 A1 * | 11/2007 | Dalton | B60T 13/746 188/72.8 |
| 2012/0017756 A1 * | 1/2012 | Bidare | F03G 7/00 92/3 |
| 2013/0292215 A1 * | 11/2013 | Eguchi | F16H 25/2266 188/72.1 |
| 2014/0158480 A1 * | 6/2014 | Qian | F16D 55/226 188/72.6 |

* cited by examiner

AIRCRAFT BRAKE PUCK ASSEMBLY

FIELD

The present disclosure relates to aircraft brake systems, and more particularly, to pucks in electro-mechanical actuators.

BACKGROUND

An electro-mechanical actuator for an aircraft brake assembly often incorporates a ball screw that rotates to drive a ball nut piston in an axial direction. The ball nut piston may have an endcap, and a puck may be inserted in the endcap. The puck may contact a brake disk to exert a braking force. The puck may be retained in the endcap with a retention spring. However, in some cases, vibrations or ice build-up around the puck may cause the puck to fall out the endcap. This may cause significant damage to a brake system and decrease the braking ability of the aircraft, as well as create foreign object damage to aircraft on a runway which may contact or ingest the puck.

SUMMARY

In various embodiments, an electro-mechanical actuator may comprise a ball nut piston, an endcap, a retaining ring, and a puck. The endcap may be coupled to the ball nut piston. The retaining ring may be coupled to the endcap. The puck may comprise a contact plate and a base. The base may be located within the retaining ring. A diameter of the base may be greater than a diameter of a lip of the retaining ring.

In various embodiments, a method of assembling an electro-mechanical actuator may comprise coupling an endcap to a ball nut piston. A puck may be positioned adjacent to the endcap. A retaining ring may be coupled to the endcap. The puck may be permanently secured within the retaining ring.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In various embodiments, an aircraft brake system may comprise an electro-mechanical actuator. The electromechanical actuator may comprise a ball screw and a ball nut piston. The ball screw may rotate in order to drive the ball nut piston in an axial direction. An endcap may be welded to the ball nut piston. A split retaining ring may be welded to the endcap and around a base of the puck. The split retaining ring may prevent removal of the puck from the endcap. Thus, the puck may be prevented from unintentionally separating from the endcap.

Figure 1:
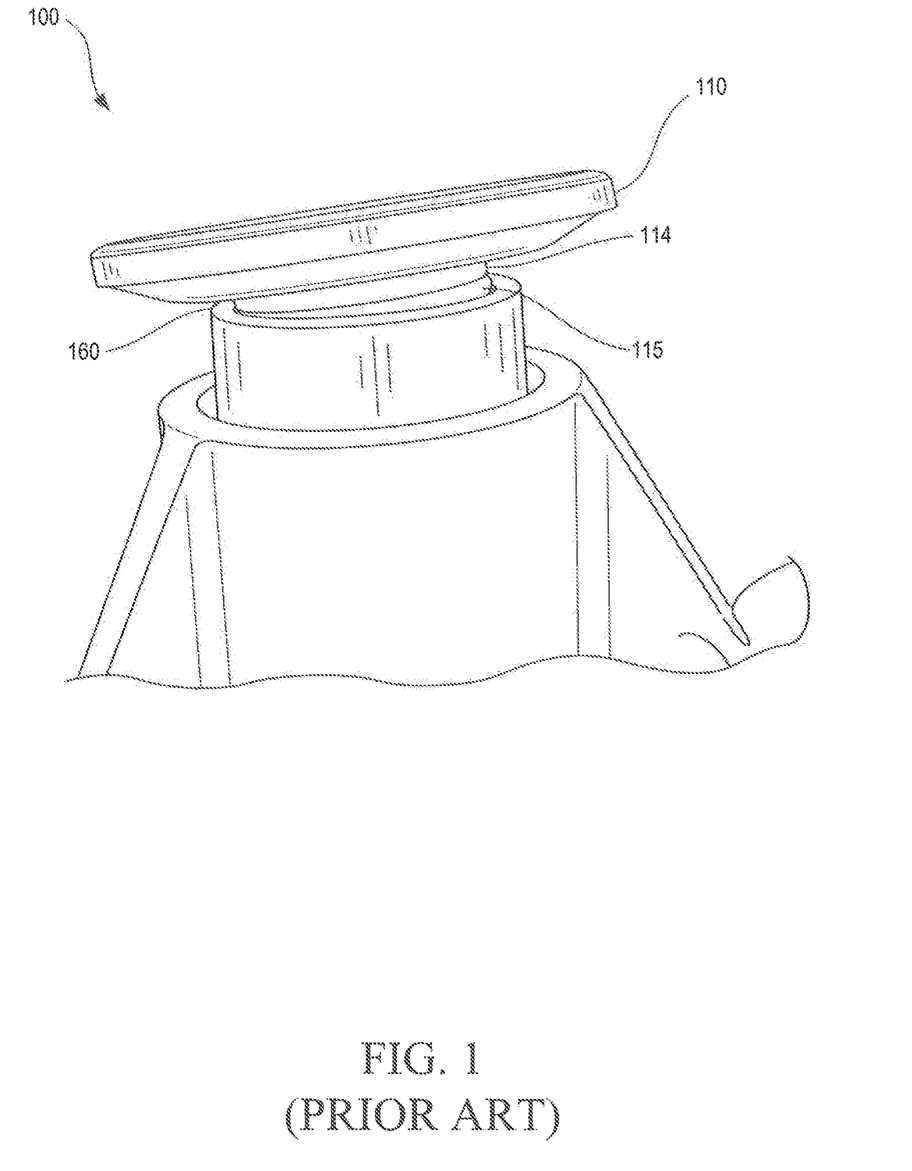
FIG. 1 illustrates a perspective view of a prior art puck.

Referring to FIG. 1, a perspective view of a prior art electro-mechanical actuator ("EMA") 100 is illustrated according to various embodiments. A puck 110 may be inserted into an endcap 160. The puck 110 may be pressed in by hand until the puck 110 snaps into place. A retention spring 115 may circumscribe a base 114 of the puck 110. The retention spring 115 may increase the amount of force necessary to remove the puck 110 from the endcap 160. However, the force may still be relatively small, such that the puck 110 may be susceptible to unintentionally separating from the endcap 160 due to vibrations or ice build-up around the puck 110.

Figure 2:
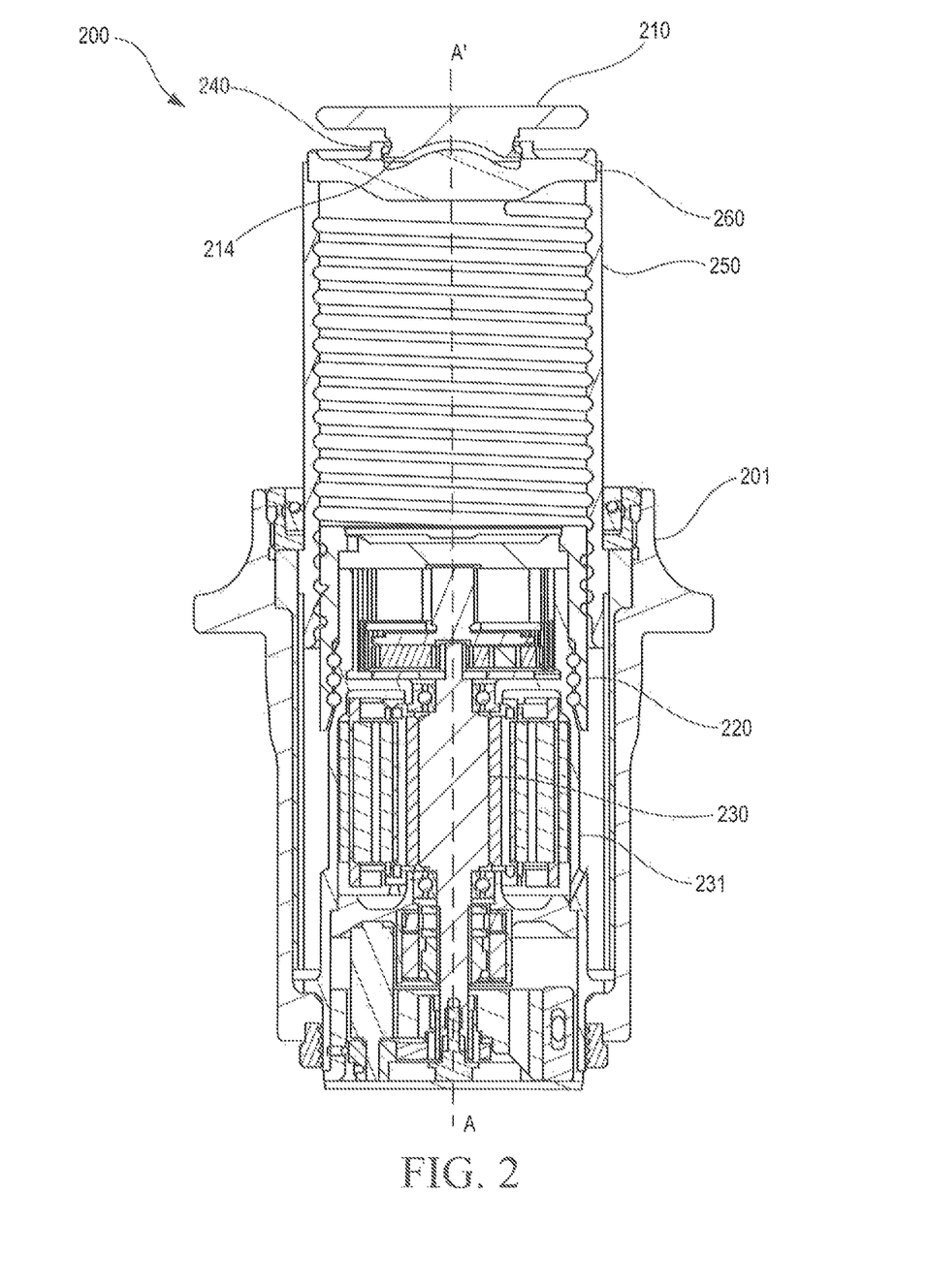
FIG. 2 illustrates a cross-section view of an electromechanical actuator in accordance with various embodiments.

Referring to FIG. 2, a cross-section view of an electromechanical actuator ("EMA") 200 is illustrated according to various embodiments. The EMA 200 may extend along the axis marked A-A', with A being located near a distal portion of EMA 200 and A' being near a proximal portion of EMA 200. The EMA 200 may, as described above, be involved in the application of a braking force to an aircraft wheel. The EMA 200 assembly may comprise an EMA housing 201, which may extend along the axis A-A'. The EMA housing 201 may house a variety of components, including, for example, a ball nut piston 250, a ball screw 220, and an actuator drive unit ("AM") 230. The ADU 230 may be located within an ADU housing 231. Generally, the ADU 230 may rotate and may drive the ball screw 220 through a plurality of rotations.

As the ball screw 220 rotates, the ball nut piston 250 may translate distally and/or proximally along the axis A-A'

(depending upon the direction of rotation of the ball screw 220). An endcap 260 may be coupled to the ball nut piston 250 at a distal end thereof. The endcap 260 may be welded to the ball nut piston 250. A puck 210 may be adjacent to the endcap 260. A retaining ring 240 may be coupled to the endcap 260 around a base 214 of the puck 210. The retaining ring 240 may be welded or riveted to the endcap 260. In various embodiments, the retaining ring 240 may comprise a split ring comprising a first half and a second half. The puck 210 may exert a pressure against a brake stack coupled to an aircraft wheel to impede or halt a rotation of the wheel. The retaining ring 240 may prevent removal of the puck 210. Thus, the puck 210 may be permanently retained within the retaining ring 240. As used herein, "permanently retained" refers to a puck that may not be removed without damaging or de-assembling another component (e.g. damaging the retaining ring 240, breaking a weld, removing a bolt, etc.) as opposed to a puck which may be removed without damaging any component by applying a force on the puck.

Figure 3:
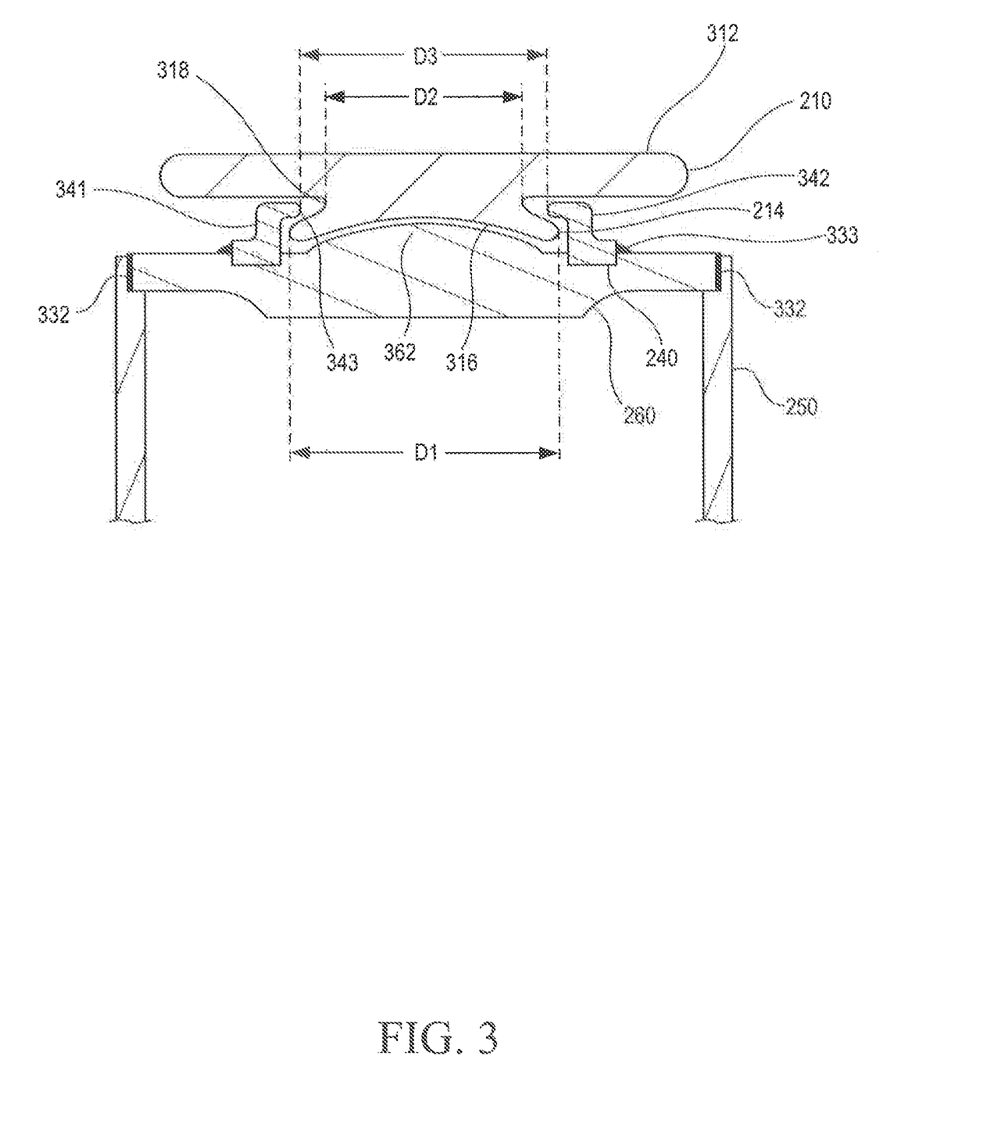
FIG. 3 illustrates a cross-section view of a puck and endcap in accordance with various embodiments.

Referring to FIG. 3, a cross-section view of the puck 210 and endcap 260 is illustrated according to various embodiments. The endcap 260 may be coupled to the ball nut piston 250. In various embodiments, the endcap 260 may be welded to the ball nut piston 250 with a weld 332. The endcap 260 may generally be in the shape of a disk having a convex dome 362 in the center of the disk.

The puck 210 may comprise a contact plate 312. The contact plate 312 may be configured to contact a brake stack to apply braking force to an aircraft. The puck 210 may comprise a base 214 located adjacent to the convex dome 362. The base 214 may comprise a concave surface 316. The concave surface 316 may allow the puck 210 to pivot about the convex dome 362. A pivoting motion may facilitate in keeping the full contact plate 312 in contact with a brake stack. A diameter D1 of the base 214 of the puck 210 may be greater than a diameter D2 of a neck 318 between the base 214 and the contact plate 312.

A retaining ring 240 may be coupled to the endcap 260. In various embodiments, the retaining ring 240 may be welded to the endcap 260 via a weld 333. The retaining ring 240 may be welded to the endear) 260 at or near the same time that the endcap 260 is welded to the ball nut piston 250. However, the retaining ring 240 may be coupled to the endcap 260 by any suitable process, such as riveting, bolting, bonding, etc. In various embodiments, the retaining ring 240 may comprise a split ring, wherein the retaining ring 240 comprises a first half 341 and a second half 342. However, in various embodiments, the retaining ring 240 may comprise a single piece, and a portion of the retaining ring 240 may be bent after installation of the puck 210 in order to retain the puck 210 within the retaining ring 240. A diameter D3 of a lip 343 of the retaining ring 240 may be greater than the diameter D2 of the neck 318, and less than the diameter D1 of the base 214. Thus, the retaining ring 240 may prevent the puck 210 from separating from the endcap 260.

Figure 4A:
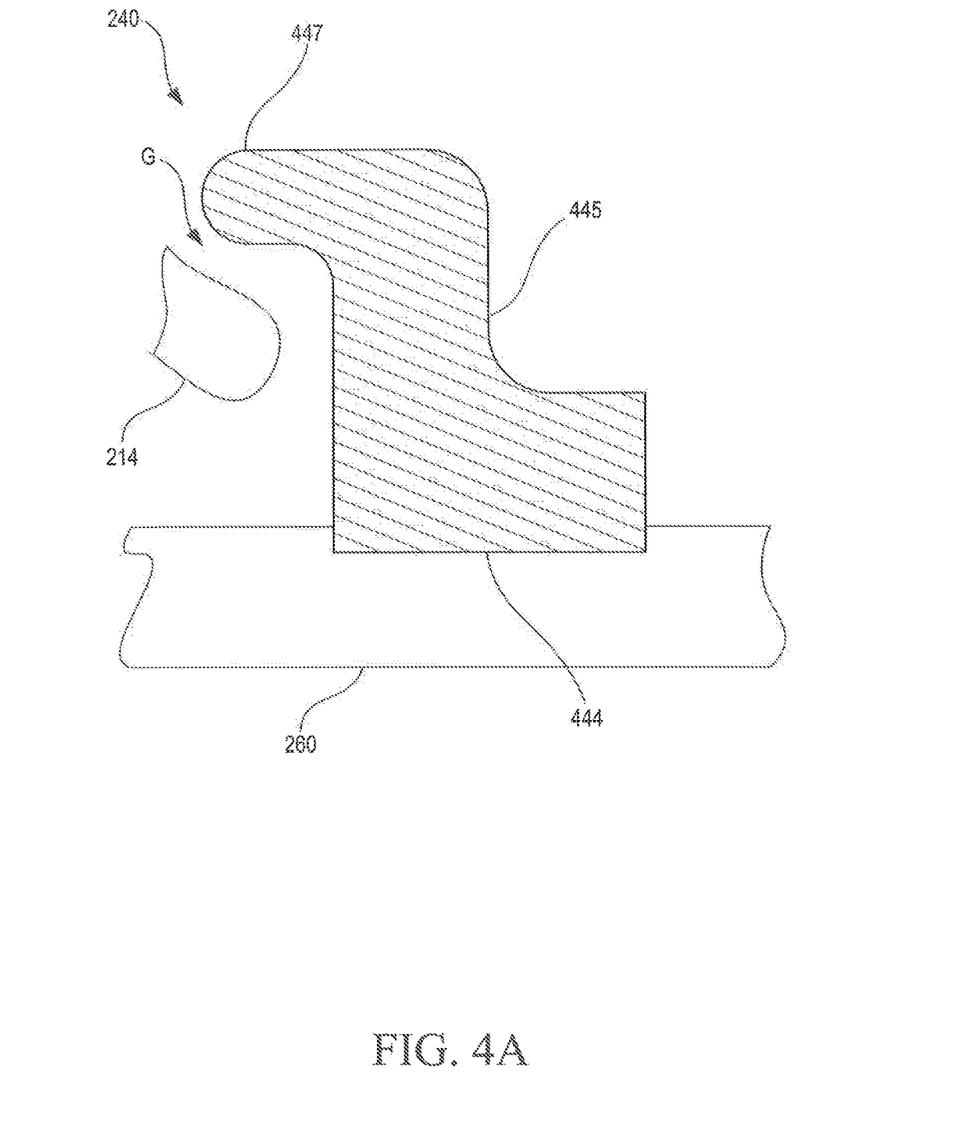
FIG. 4A illustrates a cross-section view of a portion of a retaining ring in accordance with various embodiments.

Referring to FIG. 4A, a cross-section of a portion of a retaining ring 240 is illustrated according to various embodiments. The retaining ring 240 may comprise a base 444 coupled to an endcap 260. A retaining ring wall 445 may extend from the base 444 away from the endcap 260. A lip 447 extending from the retaining ring wall 445 may overlap the base 214 of a puck, such that the puck is retained within the retaining ring 240. In various embodiments, the retaining ring 240 may be a split ring which is coupled to the endcap 260 after the base 214 of the puck is placed adjacent to the endcap 260.

A gap G may be present between the base 214 of the puck and the lip 447 of the retaining ring 240. The gap G may provide freedom of motion for the base 214 of the puck, allowing the puck to pivot within the retaining ring 240, in various embodiments, a spring or other component may be placed between the base 214 and the retaining ring 240 to provide damping while still allowing the puck to pivot within the retaining ring 240.

Figure 4B:
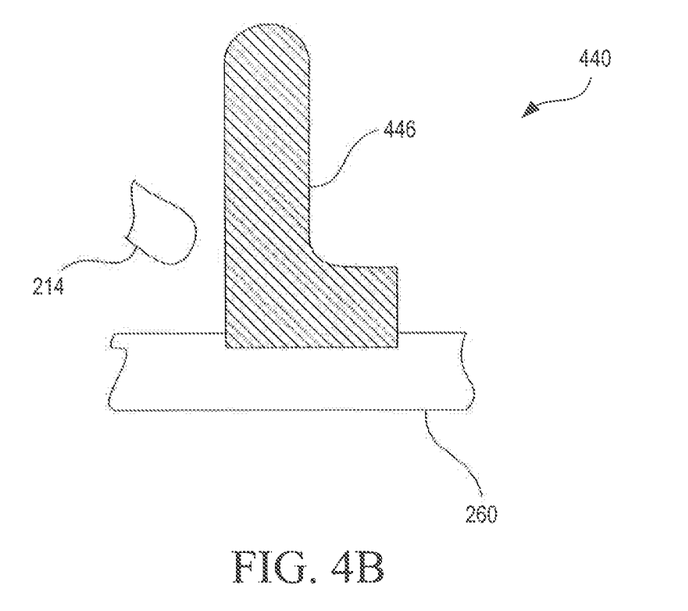
FIG. 4B illustrates a cross-section view of a portion of an unbent retaining ring in accordance with various embodiments.
Figure 4C:
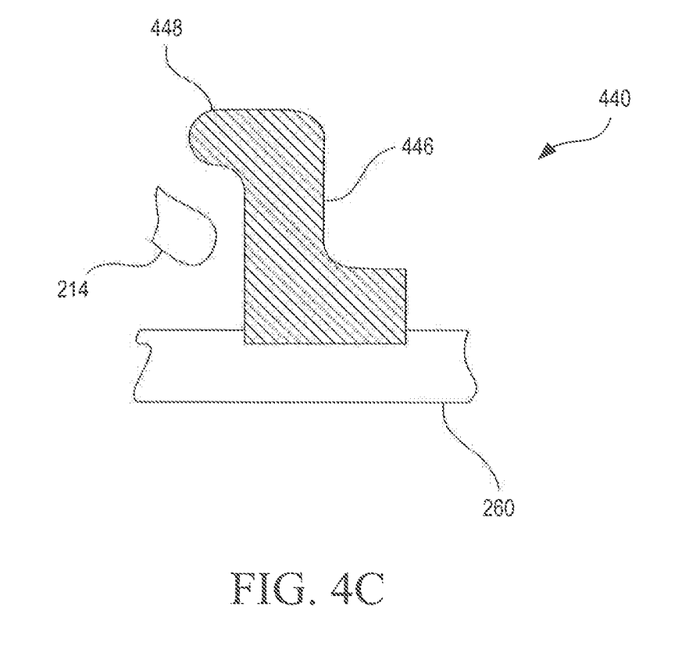
FIG. 4C illustrates a cross-section view of a bent retaining ring in accordance with various embodiments.

Referring to FIGS. 4B and 4C, an integral retaining ring is illustrated according to various embodiments. In FIG. 4B, the retaining ring 440 is illustrated prior to a lip being formed. In FIG. 4C, the retaining ring 440 is illustrated after a lip is formed. In various embodiments, a retaining ring 440 may be an integral component, such that the retaining ring 440 is a single continuous ring. In such embodiments, the lip 448 may not be present when the retaining ring 440 is coupled to the endcap 260. The retaining ring 440 may be coupled to the endcap 260 before the puck is positioned next to the endcap 260. The base 214 of the puck may be positioned within the retaining ring 440, and the lip 448 may be formed by bending a portion of the retaining ring wall 446 such that a bent portion of the retaining ring wall 446 forms the lip 448 and overlaps the base 214 of the puck. In various embodiments, the lip 448 may be bent to be perpendicular with the retaining ring wall 446. However, the lip 448 may be bent to any suitable angle with respect to the retaining ring wall 446 such that the lip 448 overlaps the base 214 of the puck.

Figure 5:
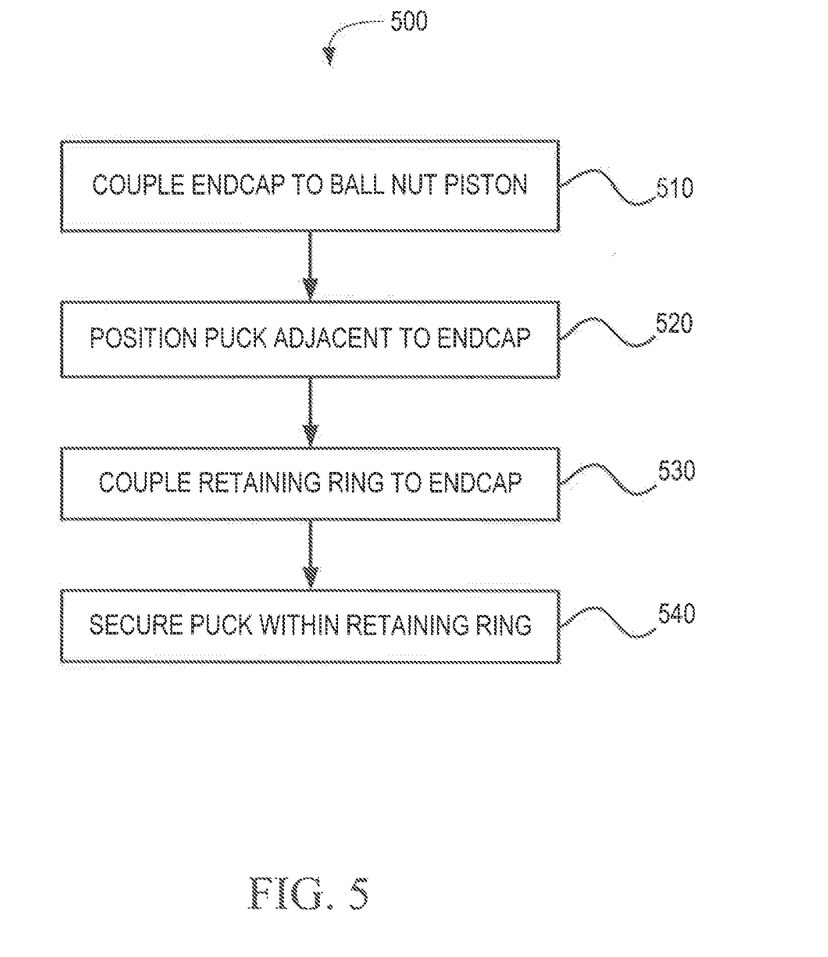
FIG. 5 illustrates a flow chart of a process for assembling an EMA in accordance with various embodiments.

Referring to FIG. 5, a flow chart 500 of a method for installing a puck is illustrated according to various embodiments. An endcap may be coupled to a ball nut piston (step 510). In various embodiments, the endcap may be welded to the ball nut piston. A puck may be positioned adjacent to the endcap (step 520). A retaining ring may be coupled to the endcap (step 530). The puck may be secured within the retaining ring (step 540). The puck may be permanently retained within the retaining ring. In various embodiments, securing the puck within the retaining ring may comprise coupling a first half of the retaining ring and a second half of the retaining ring to the endcap and around a base of the puck. However, in various embodiments, securing the puck within the retaining ring may comprise coupling the retaining ring to the endcap, inserting the base of the puck within the retaining ring, and then bending the retaining ring over the base of the puck. In various embodiments, the retaining ring may be welded, riveted, bolted, and/or bonded to the endcap.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electro-mechanical actuator ("EMA") comprising:
    a ball nut piston;
    an endcap coupled to the ball nut piston, the endcap comprising a convex dome in a center of the endcap;
    a retaining ring coupled to the endcap; and
    a puck comprising a contact plate and a base located adjacent to the convex dome, wherein the contact plate is configured to contact a brake stack, wherein the base of the puck comprises a concave surface, wherein the base of the puck is located within the retaining ring, wherein the retaining ring prevents removal of the base of the puck from within the retaining ring, wherein the puck is pivotable about the convex dome, and the concave surface of the base is retained by a lip of the retaining ring, wherein a diameter of the base is greater than a diameter of the lip of the retaining ring such that the base is retained distal of the lip.

2. The EMA of claim 1, wherein the retaining ring comprises a split ring.

3. The EMA of claim 2, wherein the split ring is welded to the endcap.

4. The EMA of claim 1, wherein the puck is permanently retained within the retaining ring.

5. The EMA of claim 1, wherein the endcap is welded to the ball nut piston.

6. The EMA of claim 1, wherein the lip comprises a bent portion of the retaining ring.

7. The EMA of claim 1, wherein the retaining ring is an integral component.

8. The EMA of claim 1, wherein the diameter of the lip is greater than a diameter of a neck of the puck.

9. The EMA of claim 1, further comprising a gap between the base and the lip.

10. A method of assembling an electro-mechanical actuator ("EMA") comprising:
    coupling an endcap comprising a convex dome in a center of the endcap to a ball nut piston;
    positioning a base of a puck adjacent to the convex dome of the endcap;
    configuring a contact plate of the puck to contact a brake stack;
    coupling a retaining ring to the endcap; and
    permanently securing the base of the puck within the retaining ring, such that a concave surface of the puck is pivotable about the convex dome, wherein the retaining ring prevents removal of the puck from the EMA; and
    bending the retaining ring to form a lip such that a diameter of the lip is less than a diameter of the base, and the retaining ring retains the concave surface of the puck distal of the lip.

11. The method of claim 10, wherein the retaining ring comprises a split ring, and wherein the coupling the retaining ring comprises coupling a first half of the retaining ring to the endcap and coupling a second half of the retaining ring.

12. The method of claim 10, further comprising inserting the puck within the retaining ring.

13. The method of claim 10, wherein the retaining ring comprises a split ring, and wherein the retaining ring is coupled to the endcap after the puck is positioned adjacent to the endcap.

14. The method of claim 10, wherein the retaining ring is an integral component, and wherein the retaining ring is coupled to the endcap before the puck is positioned adjacent to the endcap.

* * * * *